United States Patent [19]

Sanders et al.

[11] 4,007,144

[45] Feb. 8, 1977

[54] THERMOSETTING CELLULOSE ESTER POWDER COATING COMPOSITIONS

[75] Inventors: Robert R. Sanders; Peter M. Grant; Robert L. Combs, all of Kingsport, Tenn.

[73] Assignee: Eastman Kodak Company, Rochester, N.Y.

[22] Filed: Feb. 27, 1976

[21] Appl. No.: 661,878

[52] U.S. Cl. .................................. 260/15; 427/189
[51] Int. Cl.² .......................................... C08L 1/14
[58] Field of Search ..................................... 260/15

[56] References Cited

UNITED STATES PATENTS

| | | | |
|---|---|---|---|
| 3,475,356 | 10/1969 | Davis et al. | 260/15 |
| 3,491,037 | 1/1970 | Keys et al. | 260/15 |
| 3,823,101 | 7/1974 | Eiland | 260/15 |
| 3,960,979 | 6/1976 | Khanna | 260/15 |

*Primary Examiner*—Edward M. Woodberry
*Attorney, Agent, or Firm*—Daniel B. Reece III; John F. Stevens

[57] ABSTRACT

A thermosetting powder coating composition comprises a low molecular weight cellulose acetate butyrate as the major component, an aminoplast crosslinking agent, a latent acid crosslinking catalyst, and certain poly(alkylene glycols).

6 Claims, No Drawings

THERMOSETTING CELLULOSE ESTER POWDER COATING COMPOSITIONS

This invention relates to thermosetting powder coating compositions and more specifically to powder coating compositions based on cellulose acetate butyrate (CAB).

Low molecular cellulose acetate butyrates are particularly useful as a base for powder coatings because they flow out to smooth, continuous coatings at relatively low temperatures, e.g., 300°–400° F. The poor impact resistance, flexibility and resistance to solvents such as acetone which such coatings exhibit can be overcome by the incorporation in the powder coating composition of a cross-linking agent which, by cross-linking the cellulose esters through available hydroxyl groups, causes a substantial increase in the molecular weight of the coating after it has been cured on a coated substrate. Such cross-linkable or thermosetting powder coating compositions contain, in addition to CAB, a cross-linking agent, such as an aminoplast compound or resin, an acid catalyst and a plasticizer. The primary purposes served by the plasticizer are facilitating melt compounding of the composition ingredients, enabling the powder coating composition to flow out during curing before crosslinking occurs and imparting toughness to films or coatings made from the compositions. The plasticizer used in CAB powder coating composition must meet a number of requirements. First, it must not cause the powder to cake during storage. Second, it must be stable at the high temperatures employed during curing of the powder coating, i.e., it must neither decompose nor volatilize significantly at temperatures up to 425° F. Third, it must not exude or migrate significantly from the cured coating.

The powder coating composition of this invention comprises a low molecular weight cellulose acetate butyrate as the major component, an aminoplast cross-linking agent, and acid cross-linking catalyst, and as the plasticizer certain poly(alkylene glycols). The composition preferably also contains an acrylic flow aid. Optionally, the composition may also contain conventional pigments, fillers, dyes, stabilizers, etc. The coating composition is in the form of a powder having an average particle size of between about 10 and 300 microns. Coatings made with the novel coating composition are characterized by high gloss, low orange peel, high impact strength and good flexibility.

The cellulose acetate butyrate component of the novel powder coating composition has a butyryl content of from about 35 to about 55% by weight, a hydroxyl content of from about 0.5% to about 3% by weight, and a viscosity of from about 0.05 to about 1.0 second. Up to about 15% acetyl content by weight is permissible. For the best balance of properties, it is preferred that when the hydroxyl content is in the higher part of this range, the viscosity is in the lower part of the stated range, and vice versa. Low viscosities within the range of from about 0.1 to about 0.3 second and hydroxyl contents of about 1.5 to 2% by weight are found to be more desirable. Although coatings having properties acceptable for some applications may be made from cellulose esters having a broader range of hydroxyl content and viscosity, the cellulose butyrate coatings of the present invention have exceptional appearance quality which makes the coatings especially desirable for applications where appearance is a major consideration.

The aminoplast crosslinking agents which can be used are well known in the art. Typical cross-linking agents include condensation products of formaldehyde with amines such as malamine, quanadine, triaminopyrimidines, diaminotriazoles, etc. Although such aminoplast compounds will, in general, function as a crosslinking agent, hexaalkoxymethylmelamines, in which the alkoxy group contains up to 20 carbon atoms, are preferred. About 2 to about 15 phr (parts per hundred parts cellulose acetate butyrate) of the hexaalkoxymethylmelamine cross-linking agent may be used in the composition. Preferably, the amount of cross-linking agent is in the range of about 3 to 10 phr. The optimum amount of cross-linking agent depends primarily on the hydroxyl content of both the CAB and poly(alkylene glycol), i.e., the amount of cross-linking agent required generally will increase as the hydroxyl content of the mentioned polymeric materials increases. Because of its availability, the cross-linking agent most preferred is hexamethoxymethylmelamine.

The acid cross-linking catalysts which can be used in the powder coating composition are well known in the art of thermosetting coating compositions. See, for example, U.S. Pat. No. 3,468,973. Such cross-linking catalysts are acids or acid derivatives which at elevated temperatures will cause the aminoplast cross-linking agent to react with pendant hydroxyl groups of the base polymer which, in accordance with this invention, is CAB. Preferably, the cross-linking catalyst is a latent acid catalyst, i.e., a compound which does not become active or effective until it is exposed to high temperatures. Such a latent cross-linking catalyst in powder coating compositions does not cause significant cross-linking at temperatures below 300° F. but becomes active and effects cross-linking at temperatures above 300° F. The use of a latent cross-linking agent permits the ingredients of the composition to be efficiently blended by means of melt compounding, for example, on hot rolls.

Examples of the preferred latent cross-linking catalyst include epoxide-blocked, organic sulfonic acids such as those described in U.S. Pat. No. 3,868,338, Lewis acids such as zinc chloride, zinc nitrate, magnesium chloride and magnesium nitrate, and salts of weak bases and strong acids such as ammonium and diammonium phosphate and ammonium sulfate. Particularly useful catalysts are the epoxide-blocked, organic sulfonic acids, especially epoxide-blocked p-toluenesulfonic acid, and magnesium and zinc nitrate hexahydrate.

The amount of the catalyst contained in our novel powder coating composition is that amount which will cause substantial crosslinking at temperatures greater than 300° C. by the reaction of the cross-linking compound with the hydroxyl groups of the CAB and poly(alkylene glycol). This amount will vary substantially depending on a number of variables such as the particular catalyst present, the time of curing and the curing temperature. Generally, the effective concentration is in the range of about 2 to 20 weight percent based on the weight of the crosslinking agent.

The poly(alkylene glycol) plasticizers useful in our novel powder coating compositions are limited to particular compositions. The poly(alkylene glycol) may be (1) poly(tetramethylene glycol) having a molecular weight of about 650 to 1000, preferably about 750, (2)

a poly(alkylene glycol) copolymer in which 10 weight percent or less is made up of units derived from ethylene oxide (ethyleneoxy units) and the remainder is made up of units derived from propylene oxide, the copolymer having a molecular weight of about 700 to 1500, preferably about 1000, or (3) poly(propylene glycol) having a molecular weight of about 700 to 1500, preferably about 1000. The poly(alkylene glycols) described are commercially available and/or can be made by procedures well-known in the art. Poly(propylene glycol) is especially preferred as the plasticizer component of our novel powder coating composition because coatings prepared from poly(propylene glycol) plasticized compositions exhibit superior moisture resistance.

The amount of plasticizer present in the powder coating composition can vary substantially depending, for example, on the particular CAB and poly(alkylene glycol) that are used. Generally, coatings having acceptable properties can be prepared from powder coating compositions in which the plasticizer is present in a concentration of about 5 to 25 phr. while best results usually can be obtained when the composition contains about 7.5 to 15 phr plasticizer.

Conventional stabilizers, such a resorcinol monobenzoate, Irganox 1093 (product of Ciba-Geigy) or Goodrite 3114 (product of B. F. Goodrich Chemical Co.), may be used in small amounts to prevent discoloration, etc. Also, conventional dyes and/or pigments such as titanium dioxide may be used.

The smoothness and gloss of coatings made from the powder coating composition frequently can be improved if the composition contains a small portion of an acrylic flow aid. Such flow aids are polymers of an alkyl acrylate or an alkylmethacrylate or are copolymers of an alkyl acrylate and an alkyl methacrylate, wherein the alkyl group has 2 to 8 carbon atoms, the polymer or copolymer has a molecular weight of about 3,000 to 20,000 and the copolymer consists of 20 to 80 mole percent methacrylate monomer and 80 to 20 percent acrylate monomer. Examples of such acrylic polymers and copolymers include poly(isobutyl acrylate), poly(2-ethylhexyl acrylate), poly(isobutyl methacrylate), poly(2-ethylhexyl methacrylate), poly(ethyl acrylate/2-ethylhexyl methacrylate), poly(ethyl methacrylate/2-ethylhexyl methacrylate), poly(isobutyl acrylate/2-ethylhexyl acrylate), poly(isobutyl methacrylate/2-ethylhexyl acrylate) and poly(isobutyl acrylate/isobutyl methacrylate).

A preferred acrylic flow aid is a copolymer of about 60 mole percent 2-ethylhexyl methacrylate and about 40 mole percent ethyl acrylate having a molecular weight of about 17,000. Such a copolymer is available as MODAFLOW Resin Modifier sold by Monsanto Company.

The amount of acrylic flow aid which will give optimum results will depend primarily on the amount of epoxy resin that is present in the powder coating composition. Generally, about 0.5 to 3 phr will cause a noticeable improvement in the quality of the coating produced by the composition. For most formulations the coatings have an excellent combination of properties can be obtained by using ½ to 2 phr of the acrylic flow aid.

The appearance of the coating may be enhanced, especially when an epoxide-blocked, organic sulfonic acid is employed as the latent crosslinking catalyst, by including in the powder coating composition certain epoxy resins. The epoxy resins which are useful are either aliphatic or aromatic epoxides derived from polyhydroxy compounds and epichlorohydrin according to known procedures. The epoxy resin component should have a weight per epoxide (W.P.E.) value in the range of about 140 to 300, preferably in the range of 180 to 200. Preferred epoxy resins are those derived from epichlorohydrin and glycerin and bisphenol-A and having a W.P.E. value of about 180 to 200. The amount of the epoxy resin component of the powder coating composition may be in the range of about 5 to 20 phr. Best results can be obtained using about 5 to 10 phr of epoxy resin.

The components of the powder coating compositions according to this invention may be mixed by dry blending in a mixer or blender (e.g., Hobart Mixer), followed by compounding in a Brabender Extruder (¾ inch) at 115°–130° C. and 50–100 rpm, granulating, cryogenically grinding and then screening to obtain a 150 mesh powder for coating. Also, the plasticizer and cellulose ester, pigment and stabilizer, if used, may be extruded at about 200° C., then mixed with the crosslinking agent, catalyst, and plasticizer in a Banbury mixer, a combination of a Banbury mixer and roll mill, a roll mill alone or an extruder at a temperature of between about 100° and 150° C. Alternatively, all the components may be dissolved in a solvent such as methylene chloride (at about 20 weight percent solids) and spray dried at a chamber temperature of about 50° C. by well-known techniques.

The powder compositions may be deposited on the substrate by use of a powder gun, by electrostatic deposition or by deposition from a fluidized bed or by other well-known methods of powder deposition. The particle size of the powder coating composition should average between 10 and 300 microns. Preferably about 95 percent of the powder has a particle size less than 105 microns. After deposition the powder is heated to a temperature sufficient to cause its particles to flow and thus fuse together to form a smooth, uniform, continuous, uncratered coating on the substrate surface. Normally, temperatures of around 350°–425° F. are required for curing.

The examples which follow are submitted for a better understanding of the invention.

In the examples, the physical properties of the coatings are determined as follows:

APPEARANCE RATING

In order to obtain appearance as a numerical value for identification, the following rating system for "orange peel" appearance and crater evaluation is used:

| | |
|---|---|
| 8 - None | 3 - Moderate |
| 7 - Trace | 2 - Moderate to heavy |
| 6 - Very slight | 1 - Heavy |
| 5 - Slight | 0 - Very heavy |
| 4 - Slight to moderate | |

ADHESION TAPE TEST

Seven horizontal score lines about 1/16 inch apart are crossed with seven vertical score lines about 1/16 inch apart using a sharp razor blade to cut through the coating to the metal.

Pressure sensitive tape (Scotch) is pressed down firmly over the crosshatched pattern and pulled off rapidly. The adhesion of the coating is rated:

| | |
|---|---|
| Excellent | - No coating is removed by the tape. |
| Good | - Only small chips of coating are removed along the incisions and at intersections of the incisions. |
| Fair | - Small chips of coating are removed in the areas between the incisions. |
| Poor | - Substantial quantities of the coating are removed. |

ADHESION PEEL TEST

With the edge of a sharp razor blade held perpendicular to the surface of the coating, two incisions are made through the coating to the substrate and intersecting at an angle of about 30°. An attempt then is made to insert a sharp knife edge or the equivalent between the coating and the substrate at the acute angles of the intersecting incisions and an effort is made to peel the coating from the substrate. The peel adhesion then is rated:

| | |
|---|---|
| Excellent | - Knife edge can be inserted only with difficulty or not at all; coating cannot be pulled off. |
| Good | - Knife edge can be inserted but only small flakes of coating can be removed. |
| Fair | - Knife edge can be inserted and moderate size flakes of coating can be removed. |
| Poor | - Knife edge can be easily inserted and large portions of the coating between the incisions can be removed intact. |

ACETONE RESISTANCE

The softening of the coating caused by acetone being applied to the surface is determined.

IMPACT STRENGTH

Impact strength is determined by using a Gardner Laboratory, Inc., Impact Tester. A weight is dropped within a slide tube from a specified height to hit a punch having a 5/8 inch diameter hemispherical nose which is driven into the front (coated face) or back of the panel. The highest impact which does not crack the coating is recorded in inch-pounds, front and reverse.

FLEXIBILITY

The test panel is bent over a period of 15 seconds, using a Gardner Laboratory, Inc., conical mandrel of specified size, according to ASTM D-522. A pass (P) or fail (F) is recorded.

GLOSS

Twenty degree and sixty degree gloss are measured using a gloss meter (Gardner Laboratory, Inc., Model GC-9095) according to ASTM D-523.

PENCIL HARDNESS

The pencil hardness of a coating is that of the hardest pencil that will not cut into the coating. The procedure for preparing the truncated cone pencil lead and carrying out the test is given in the National Coil Coaters Associated Technical Bulletin No. II (August 12, 1968). Results are expressed according to the following scale:

(softest) 6B, 5B, 4B, 3B, 2B, B, HB, F, H, 2H, 3H, 4H, 5H, 6H (hardest)

FUSION OF THE COATING

Coated test panels are placed in a Freas Model 625A forced air oven and fused at a specified temperature for 10 minutes. The fused coatings are then hung on a bar to cool at room temperature.

EXAMPLES 1–6

Powder coating compositions were prepared by dry blending the components listed below, melt compounding the blend on hot rolls and cryogenically grinding the composition to less than 140 mesh powder.

| Component | Parts by Weight |
|---|---|
| CAB: acetyl = 2.0; butyryl = 53; hydroxyl = 1.6; viscosity = 0.15–0.30 | 100 |
| Titanium dioxide: R-100 | 50 |
| Hexamethoxymethylmelamine: Cymel 300 | 5 |
| Crosslinking catalyst: 80:10:10 weight percent mixture of Epon 815 epoxy resin:p-toluenesulfonic acid:n-butanol | 1 |
| Poly(tetramethylene glycol) | XX |
| Stabilizer: Good-rite 3114 | 0.5 |

The molecular weight and parts by weight of the poly(tetramethylene glycol) used in each example were as follows: Example 1 — 650, 2; Example 2 — 650, 5; Example 3 — 650, 7.5; Example 4 — 650, 10; Example 5 — 1000, 2; Example 6 — 1000, 5. The powder coating compositions were applied electrostatically to 20 gauge phophatized steel panels and cured for 10 minutes in a forced air oven at a predetermined temperature. The coatings thus prepared were tested as described above. The results of the evaluation are set forth in Table I.

EXAMPLE 7

Example 1 was essentially duplicated except that 7.5 phr of an ethylene oxide adduct of poly(propylene glycol) containing about 10 weight percent ethyleneoxy units and 90 weight percent propyleneoxy units and having a molecular weight of about 1000 was used rather than a poly(tetramethylene glycol). The properties of coatings of the composition are shown in Table I. The weight percent volatiles lost during curing at 400° F. for 10 minutes was 1.7.

EXAMPLES 8–9

Example 1 was essentially duplicated except that 7.5 phr of (1) poly(propylene glycol) having a molecular weight of about 700 and (2) poly(propylene glycol) having a molecular weight of about 1000 were used,

EXAMPLE 12

Example 1 was duplicated substantially except that 5 phr. of the epoxy resin was used. The properties and characteristics of coatings prepared therefrom are shown in Table I.

Table I

| Example | Fusion Temp., °F | Thickness, Mils | Gardner Gloss 20° | Gardner Gloss 60° | Appearance Rating Orange Peel | Appearance Rating Crater | Impact Strength In.-Lb. Front | Impact Strength In.-Lb. Reverse | Pencil Hardness | Adhesion Scotch Tape | Adhesion Peel | Flexibility, 1/8" Mandel | Acetone Resistance |
|---|---|---|---|---|---|---|---|---|---|---|---|---|---|
| 1 | 375 | 1.6 | 27 | 69 | 3 | 8 | >160 | 130 | B | G | Ex | P | Excellent |
| 2 | 400 | 1.2 | 44 | 73 | 6 | 8 | >160 | >160 | — | G | Ex | P | Good |
| 3 | 400 | 1.5 | 50 | 78 | 6 | 8 | >160 | >160 | B | G | Ex | P | Good |
| 4 | 400 | 1.0 | 35 | 67 | 6 | 8 | >160 | >160 | — | G | Ex | P | Good |
| 5 | 375 | 1.7 | 18 | 57 | 4 | 7 | 150 | 120 | B | G | Ex | P | Excellent |
| 6 | 400 | 1.8 | 34 | 74 | 5 | 8 | 150 | 130 | B | G | Ex | P | — |
| 7 | 400 | 2.4 | 45 | 74 | 5+ | 8 | >160 | 130 | — | G | Ex | P | Excellent |
| 8a | 375 | 1.5 | 28 | 64 | 5 | 8 | >160 | 110 | — | G | Ex | P | Fair |
| 8b | 425 | 1.4 | 31 | 67 | 6 | 8 | >160 | 110 | B | G | Ex | P | Excellent |
| 9a | 400 | 1.4 | 23 | 63 | 5 | 8 | >160 | 140 | B | G | Ex | P | Excellent |
| 9b | 450 | 1.5 | 29 | 66 | 5 | 8 | >160 | 70 | — | G | Ex | P | Excellent |
| 10 | 400 | 2.3 | 60 | 83 | 6 | 8 | 90 | 20 | — | G | Ex | P | — |
| 11 | 425 | 1.7 | 34 | 72 | 4 | 7 | 140 | 50 | 2B | G | Ex | P | Good |
| 12 | 425 | 1.5 | 41 | 75 | 5 | 7 | >160 | 90 | 2B | G | Ex | P | Good | respectively, in the compositions of Examples 8 and 9. Properties of coatings of these compositions on phosphatized steel panels are set forth in Table I. Coatings of the compositions of Examples 8 and 9 on phosphatized steel, untreated, clean steel and aluminum panels exhibited adequate adhesion after being immersed in water for 72 hours.

EXAMPLE 10

Example 7 was essentially duplicated except that 5 phr of an epoxy resin derived from epichlorohydrin and bisphenol A having a W.P.E. value of approximately (Epon 828) and 1 phr of an acrylic flow aid, a copolymer of about 60 mole percent 2-ethylhexyl methacrylate and about 40 mole percent ethyl acrylate having a molecular weight of about 17,000 (MODAFLOW Resin Modifier). The properties of a coating of this composition are shown in Table I. The appearance and adhesion of coatings on phosphatized steel, untreated, clean steel and aluminum panels after immersion in water for 72 hours was good to excellent.

EXAMPLE 11

According to the procedure described in Example 1, a powder coating composition was prepared from the following components:

| Component | Parts by Weight |
|---|---|
| CAB: acetyl = 2.0; butyryl = 53; hydroxyl = 1.6; viscosity = 0.15–0.30 | 100 |
| Titanium dioxide: R-100 | 50 |
| Hexamethoxymethylmelamine: Cymel 300 | 5 |
| Catalyst: zinc nitrate hexahydrate | 0.1 |
| Poly(alkylene glycol): 10 weight percent ethylene oxide adduct of poly-(propylene glycol), molecular weight about 1000 | 7.5 |
| Stabilizer: Good-rite 3114 | 0.5 |
| Epoxy resin of Example 10 | 1.0 |

Coatings of this composition were prepared, cured and tested as described in Example 1. The results of the tests are shown in Table I.

The invention has been described in detail with particular reference to certain preferred embodiments thereof, but it will be understood that variations and modifications can be effected within the spirit and scope of the invention.

We claim:

1. A thermosetting coating composition in the form of a powder having an average particle size of between about 10 and about 300 microns comprising:
    a. cellulose acetate butyrate having a butyryl content of about 35 to 55% by weight, a hydroxyl content of about 0.5 to 3.0% by weight, an acetyl content of up to about 15% by weight, and a viscosity of about 0.05 to 1.0 second;
    b. about 2 to 15 phr by weight of hexaalkoxymethylmelamine cross-linking agent wherein the alkoxy group contains from 1 to 20 carbon atoms;
    c. a catalytic amount of latent acid crosslinking catalyst; and
    d. a plasticizing amount of (1) poly(tetramethylene glycol) having a molecular weight of about 650 to 1000, or (2) a poly(alkylene glycol) derived from propylene oxide or propylene oxide and ethylene oxide having a molecular weight of about 700 to 1500 and containing not more than 10 weight percent ethyleneoxy units.

2. A composition according to claim 1 comprising
    a. cellulose acetate butyrate having a butyryl content of about 35 to 55% by weight, a hydroxyl content of about 0.5 to 3.0% by weight, an acetyl content of up to about 15% by weight, and a viscosity of about 0.05 to 1.0 second;
    b. about 2 to 15 phr by weight of a hexaalkoxymethylmelamine crosslinking agent wherein the alkoxy group contains from 1 to 20 carbon atoms;
    c. about 2 to 20 weight percent based on the weight of the cross-linking agent of a latent acid cross-linking agent; and
    d. about 5 to 25 phr by weight of (1) poly(tetramethylene glycol) having a molecular weight of about 650 to 1000, or (2) a poly(alkylene glycol) derived from propylene oxide or propylene oxide and ethylene oxide having a molecular weight of about 700 to 1500 and containing not more than 10 weight percent ethyleneoxy units.

3. A thermosetting coating composition in the form of a powder having an average particle size of between about 10 and about 300 microns comprising:
   a. cellulose acetate butyrate having a butyryl content of about 35 to 55% by weight, a hydroxyl content of about 0.5 to 3.0% by weight, an acetyl content of up to about 15% by weight, and a viscosity of about 0.05 to 1.0 second;
   b. about 3 to 10 phr by weight of hexamethoxymethylmelamine;
   c. a catalytic amount of latent acid cross-linking agent; and
   d. 7.5 to 15 phr by weight of (1) poly(tetramethylene glycol) having a molecular weight of about 750, or (2) a poly(alkylene glycol) derived from propylene oxide or propylene oxide and ethylene oxide having a molecular weight of about 1000 and containing not more than 10 weight percent ethyleneoxy units.

4. A composition according to claim 3 wherein component (c) is present in an amount of about 2 to 20 weight percent based on the weight of the hexamethoxymethylmelamine and component (d) is poly(propylene glycol).

5. A composition according to claim 3 wherein component (c) is an epoxide-blocked, organic sulfonic acid, a Lewis acid or a salt of a weak base and a strong acid and is present in an amount of 2 to 20 weight percent based on the weight of the hexamethoxymethylmelamine and component (d) is poly(propylene glycol).

6. A thermosetting coating composition in the form of a powder having an average particle size of between about 10 and about 300 microns comprising:
   a. cellulose acetate butyrate having a butyryl content of about 35 to 55% by weight, a hydroxyl content of about 0.5 to 3.0% by weight, an acetyl content of up to about 15% by weight, and a viscosity of about 0.05 to 1.0 second;
   b. about 3 to 10 phr by weight of hexaalkoxymethylmelamine crosslinking agent wherein the alkoxy group contains from 1 to 20 carbon atoms;
   c. a catalytic amount of an epoxide-blocked organic sulfonic acid, magnesium nitrate or zinc nitrate; and
   d. about 7.5 to 15 phr by weight of poly(propylene glycol) having a molecular weight of about 1000.

* * * * *